(12) United States Patent (10) Patent No.: US 9,142,842 B2
Bose (45) Date of Patent: Sep. 22, 2015

(54) COMPOSITE MEMBRANE FOR POLYMER ELECTROLYTE MEMBRANE FUEL CELL

(75) Inventor: Anima B. Bose, Athens, OH (US)

(73) Assignee: Ohio University, Athens, OH (US)

( * ) Notice: Subject to any disclaimer, the term of this patent is extended or adjusted under 35 U.S.C. 154(b) by 5 days.

(21) Appl. No.: 13/513,035

(22) PCT Filed: Dec. 3, 2010

(86) PCT No.: PCT/US2010/058909

§ 371 (c)(1), (2), (4) Date: Aug. 29, 2012

(87) PCT Pub. No.: WO2011/069077

PCT Pub. Date: Jun. 9, 2011

(65) Prior Publication Data

US 2012/0312695 A1 Dec. 13, 2012

Related U.S. Application Data

(60) Provisional application No. 61/266,794, filed on Dec. 4, 2009.

(51) Int. Cl.
*H01M 4/86* (2006.01)
*H01M 4/90* (2006.01)
*H01M 8/02* (2006.01)
*H01M 4/88* (2006.01)
*H01M 8/10* (2006.01)
*H01M 4/92* (2006.01)

(52) U.S. Cl.
CPC .......... *H01M 8/0291* (2013.01); *H01M 4/8652* (2013.01); *H01M 4/881* (2013.01); *H01M 8/1023* (2013.01); *H01M 8/1025* (2013.01); *H01M 8/1039* (2013.01); *H01M 8/1051* (2013.01); *H01M 8/1081* (2013.01); *H01M 4/8668* (2013.01); *H01M 4/92* (2013.01); *H01M 2300/0082* (2013.01); *H01M 2300/0091* (2013.01); *Y02E 60/523* (2013.01)

(58) Field of Classification Search
USPC .............................................. 429/313, 33, 309
See application file for complete search history.

(56) References Cited

U.S. PATENT DOCUMENTS 7,563,828 B2 * 7/2009 Taylor-Smith ................... 521/30
7,662,498 B2 * 2/2010 Murata et al. .................. 429/494

(Continued)

FOREIGN PATENT DOCUMENTS

WO 2008127645 A1 10/2008

OTHER PUBLICATIONS

Kickelbick, "Concepts for the incorporation of inorganic building blocks into organic polymers on a nanoscale," Prog. Polym. Sci. 28:83-114, 2003.

(Continued)

*Primary Examiner* — Peter D Mulcahy
*Assistant Examiner* — Henry Hu
(74) *Attorney, Agent, or Firm* — Wood, Herron & Evans, LLP

(57) ABSTRACT

The present invention relates generally to conducting polymer composites for use in electrochemical applications and electrolysis applications, and methods of making the same. A composite material is provided that includes a conducting polymer; and a silsesquioxane compound. The composite material is used to prepare ion conducting membranes and membrane electrode assemblies (MEA).

5 Claims, 6 Drawing Sheets

(56) References Cited

U.S. PATENT DOCUMENTS

| | | |
|---|---|---|
| 7,998,415 B2 | 8/2011 | Hartmann-Thompson |
| 8,097,683 B2 | 1/2012 | Keller et al. |
| 8,304,134 B2 | 11/2012 | Miyake et al. |
| 8,545,823 B2 * | 10/2013 | Maitra et al. .................. 424/64 |
| 2006/0141315 A1 * | 6/2006 | Murata et al. .................. 429/33 |
| 2006/0199059 A1 | 9/2006 | Xu |
| 2007/0190385 A1 | 8/2007 | Lee et al. |
| 2008/0312072 A1 * | 12/2008 | Vescovi et al. ................ 502/159 |
| 2009/0176141 A1 | 7/2009 | Santurri et al. |
| 2010/0012708 A1 * | 1/2010 | Steward et al. ................ 228/209 |
| 2010/0104918 A1 * | 4/2010 | Nowak et al. .................. 429/33 |
| 2011/0190526 A1 * | 8/2011 | Barboiu et al. ................ 556/421 |
| 2011/0214996 A1 * | 9/2011 | Yoshida et al. ............... 205/633 |

OTHER PUBLICATIONS

Yu et al., "Crosslinked sulfonated poly (bis-A)-sulfones as proton exchange membrane for PEM fuel cell application," J. Mater. Sci. 45:1017-1024, 2010.

* cited by examiner

COMPOSITE MEMBRANE FOR POLYMER ELECTROLYTE MEMBRANE FUEL CELL

CROSS-REFERENCE TO RELATED APPLICATIONS

Pursuant to 37 C.F.R. §1.78, this application claims the benefit of and priority to prior filed co-pending PCT Patent Application PCT/US2010/058909, which was filed on Dec. 3, 2010 and claims priority to Provisional Patent Application Ser. No. 61/266,794, filed Dec. 4, 2009.

FIELD OF INVENTION

The present invention relates generally to conducting polymer composites for use in electrochemical applications, such as alkaline membrane fuel cells (AMFC), proton exchange membrane fuel cells (PEMFC) and direct methanol fuel cells (DMFC), and electrolysis applications, such as acid-base electrolysis. Methods for producing the composites are disclosed.

BACKGROUND OF INVENTION

A fuel cell is an electrochemical conversion device that directly converts chemical energy into electric energy. This conversion is accomplished by supplying a fuel and an oxidizing agent to two electrodes that are electrically connected and electrochemically inducing oxidation of the fuel. A fuel cell may be configured by stacking a plurality of unit cells containing, as a basic structure, a membrane-electrode assembly (MEA) in which an electrolyte membrane is sandwiched between a pair of electrodes. Among such fuel cells, a proton exchange membrane fuel cell (PEMFC), which uses a solid polymer electrolyte membrane as the electrolyte membrane, is a particularly attractive power source.

A proton exchange membrane fuel cell (PEMFC) transforms the chemical energy liberated during the electrochemical reaction of hydrogen and oxygen to electrical energy, as opposed to the direct combustion of hydrogen and oxygen gases to produce thermal energy. A stream of hydrogen is delivered to the anode side of the membrane electrode assembly (MEA) and is catalytically split into protons and electrons. This oxidation half-cell reaction is represented in Equation 1:

$$H_2 \rightarrow 2H^+ + 2e^-\ E° = 0V_{SHE} \quad \text{(Equation 1)}$$

The newly formed protons permeate through the polymer electrolyte membrane to the cathode side. The electrons travel along an external load circuit to the cathode side of the MEA, thus creating the current output of the fuel cell.

Meanwhile, a stream of oxygen is delivered to the cathode side of the MEA. At the cathode side oxygen molecules react with the protons permeating through the polymer electrolyte membrane and the electrons arriving through the external circuit to form water molecules. This reduction half-cell reaction is represented in Equation 2:

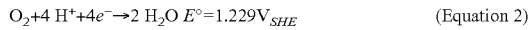

$$O_2 + 4H^+ + 4e^- \rightarrow 2H_2O\ E° = 1.229V_{SHE} \quad \text{(Equation 2)}$$

The proton conducting polymer membrane, which primarily comprises a proton conducting polymer, is a central component of PEMFCs. The proton conducting polymer, which is a species of an ionomer, is sandwiched between anode and cathode. The primary function of these membranes is to carry protons from the anode to the cathode.

Sulfonated tetrafluoroethylene based fluoropolymer-co-polymers, such as Nafion®, sulfonated poly(ether ether ketone) such as SPEEK, sulfonated polyimides and others proton conducting polymers are generally used in PEMFCs and DMFCs. Nafion® is generally considered the ionomer of choice in the catalyst matrix to transport protons to and from bulk electrolyte to the catalyst matrix. Proton exchange membrane polymers, especially Nafion®, perform best in the temperature range of about 65° C. to about 80° C. in fuel cells. At higher temperatures, these polymers display function deterioration due to poor proton conductivity, dehydration, and lack of thermal and mechanical stability. Anion exchange membranes (AEM), such as quaternary ammonium cation functionalized polymers, can display similar function deterioration and encounter stability issues with increasing temperature.

On the other hand, platinum, which is the universally-accepted electro-catalyst for both anodes and cathodes, is very expensive and performs better at higher temperatures, especially for oxygen reduction. Other electro-catalysts, such as non-platinum metals or very low platinum-content metal alloys, which may be more cost effective than pure platinum, tend to perform adequately at temperatures higher than 100° C. These higher temperatures tend to reduce catalyst deactivation by carbon monoxide poisoning. But high performance of precious and non-precious catalysts is difficult to exploit due to limitations inherent to the proton exchange membrane polymers, as discussed above.

Attempts have been made to increase the performance, (e.g., thermal, chemical and mechanical stability) of conducting polymers and ionomers by incorporating oxide fillers, such as silica, in the polymer matrix. However, polymers which incorporate oxide fillers have encountered problems, such as stability over time due to phase separation. Moreover, the preparation of the oxide incorporated fillers is a multi-step time consuming process. Therefore, a need exists for conducting polymers with increased stability and methods of making the same.

SUMMARY OF THE INVENTION

In one embodiment of the invention, a composite material is provided comprising a conducting polymer; and a silsesquioxane.

In another embodiment of the invention, an electrode is provided comprising as a catalyst a precious metal, semi-precious metal, or mixtures or alloys thereof, together with a composite material comprising a conducting polymer and a silsesquioxane.

In yet another embodiment of the invention, an apparatus is provided comprising an electrode comprising a catalyst such as a precious metal, semi-precious metal, or mixtures or alloys thereof, together with a composite material comprising a conducting polymer, and a silsesquioxane, and a membrane comprising the conducting polymer and a silsesquioxane.

In yet another embodiment of the invention, a method of increasing water uptake of a composite material is provided that includes combining a silsesquioxane compound and a conducting polymer material to form the composite material, wherein the silsesquioxane compound and the conducting polymer form a tighter polymeric network that thereby reduces swelling of the composite material upon hydration, and wherein the reduced swelling is relative to the same conducting polymer material without the silsesquioxane compound present.

In yet another embodiment of the invention, a method of reducing a swelling ratio of a composite material upon hydration relates to combining a silsesquioxane compound and a conducting polymer material to form the composite material, wherein the silsesquioxane compound and the conducting polymer form a tighter polymeric network; and wherein the swelling ratio is a volume increase of the composite material from a dehydrated form relative to the volume increase of the same conducting polymer material without the silsesquioxane compound present.

In yet another embodiment of the invention, a method of forming a composite material membrane is provided that includes combining a silsesquioxane compound and a conducting polymer material to form the composite material membrane, wherein the composite membrane is characterized by a reduced relative humidity requirement while maintaining a stable operating current density.

In view of the foregoing, embodiments of the present invention provide new composite membrane materials and their properties to enhance the performance and durability of fuel cells and other energy delivery devices. This invention entails the creation of a composite proton conducting polymer to create durable fuel cell membrane that functions at higher temperatures compared to widely used membranes, such as Nafion®. The composite membrane is created by incorporating low concentrations (e.g., 10 wt %) OctaSilane POSS® (OSP) as an additive to proton conducting polymers (such as Nafion®). This additive homogenously blends in the polymeric network that improves the membrane and/or electrode catalyst properties in various ways, such as 1) controls membrane swelling in hydrated environment; 2) enhances thermal and mechanical property; 3) improves the cell performance without sacrificing proton conductivity at elevated temperature; 4) improves cells life due to its high oxidative stability; and 5) reduces the relative humidity required for cells to operate. Embodiments of this invention also demonstrate the use of OctaSilane POSS® composite in porous electrode engineering, which helps to reduce activation losses.

The present invention will be further appreciated in light of the following detailed description and drawings in which:

DETAILED DESCRIPTION OF THE INVENTION

Figure 1:
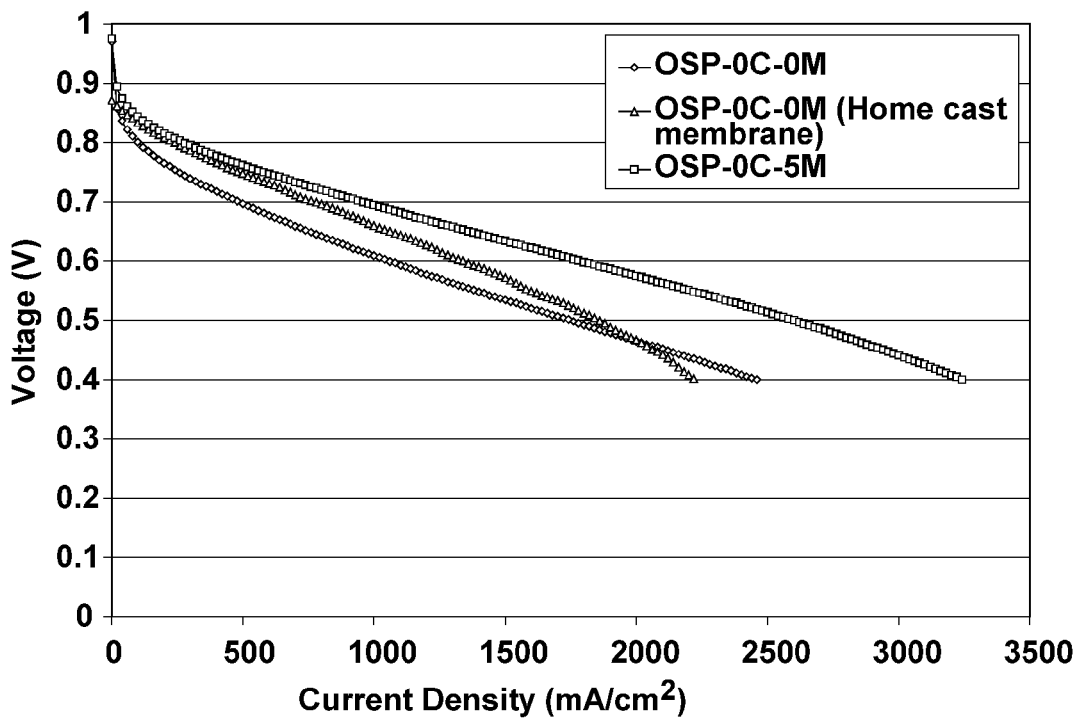
FIG. 1 is a graphical presentation of the performance of various membrane electrode assemblies (MEAs) at 80° C. and 100% relative humidity (RH).

The present invention is directed to a composite material, which is suitable for use in electrochemical and electrolysis applications. The composite material comprises a conducting polymer and a silsesquioxane compound.

The conducting polymer or ionomer is generally selected for its mechanical properties, such as structure and flexibility, heat resistance properties and properties of resistance to hydrolysis and to the oxidation of the medium of the fuel cell or electrolyzer. Accordingly, suitable proton conducting polymers may include fluoropolymer electrolytes such as perfluorocarbonsulfonic acid resins and also hydrocarbon-based polymer electrolytes in which a protonic acid group (proton conductive group) such as a sulfonic acid group, a carbonic acid group, a phosphoric acid group, or a boronic acid group is introduced in hydrocarbon-based polymers, such as polyetheretherketones, polyetherketones, polyethersulfones, polyphenylene sulfide, polyphenylene ethers, polyparaphenylene, and plastics for general applications such as polyethylene, polypropylene, and polystyrene. For example, the proton conducting polymer may be selected from a sulfonated tetrafluoroethylene-based fluoropolymer-copolymer; a sulfonated poly(ether ether ketone); or a sulfonated polyimide.

One such proton conducting polymer is a sulfonated tetrafluoroethylene-based fluoropolymer-copolymer. For example, the sulfonated tetrafluoroethylene-based fluoropolymer-copolymer may be ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, which is commercially available from the E. I. du Pont de Nemours and Company, under the tradename Nafion®. Specifically, Nafion® is a perfluorosulfonic acid and polytetrafluoroethylene (PTFE) copolymer and is commercially-available as a chemically-stabilized dispersion that is in a solvent mixture predominantly comprised of water, propanol and ethanol.

Amine functionalized polymers are exemplary anion-conducting ionomers. For example, quaternary ammonium functionalized polysulfone polymers are suitable for use in alkaline membrane fuel cells (AMFC). Many varieties of aminated polymers can be formed by applying techniques commonly known in the art to functionalize polysulfones. For example, a commercially-available polysulfone can be aminated by sequential chloromethylation and quaternization with a tertiary amine. The resulting quaternary ammonium functionalized polysulfone polymer can be alkalized by treatment with a solution of hydroxide or carbonate. In one embodiment, the anion conducting polymer is a trimethyl ammonium-functionalized poly(arylene ether sulfone).

The silsesquioxane compound may include an oligomeric silsesquioxane compound. An oligomeric silsesquioxane compound is a molecule of which the repeating unit has the formula $RSiO_{3/2}$. The term "silsequi" refers to the ratio of the silicon and oxygen atoms, i.e., Si:O=1:1.5. An oligomeric silsesquioxane compound can have different molecular structure, such as random, ladder-like, cage and partial cage structures. In one embodiment, the oligomeric silsesquioxane is characterized by having a cage structure.

Exemplary oligomeric silsesquioxanes include polyhedral oligomeric silsesquioxanes, which are also designated by the registered trademark POSS® (owned by Hybrid Plastics, Inc.). Generally the term "POSS" indicates the oligomeric silsequioxanes with a cage structure, even a partial one, and may have the general formula $(RSiO_{3/2})_n$, where R denotes various monovalent group and n may range from 6 to 18. In one embodiment, R is $HMe_2SiO$ and n is equal to 8, which is a silsesquioxane compound that is commercially-available from Hybrid Plastics, Inc. as a solid and is sold under the tradename OctaSilane POSS®. The chemical structure of OctaSilane POSS® is shown in Formula 1.

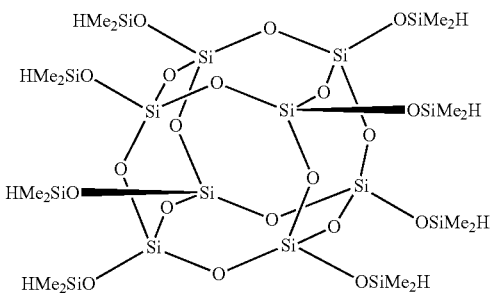

Formula 1: OctaSilane POSS®

The composite membrane may be prepared by combining the conducting polymer and the silsesquioxane in a solvent or a mixture of solvents, which is then followed by removal of the solvent by, for example, thermal evaporation. Generally, both the conducting polymer and the silsesquioxane are mixed as dispersions in solvents that are miscible with respect to each other. In one embodiment, a commercially-available Nafion® dispersion, which comprises water, propanol and ethanol as the solvent, is agitated while a solution of OctaSilane POSS® in n-methylpyrrolidinone (NMP) or tetrahydrofuran (THF) is slowly added over a period of two hours.

The relative mass ratio of the conducting polymer to the silsesquioxane compound may vary between a range of about 100:1 to about 2:1. Also the ratio may be from about 50:1 to about 4:1. The ratio may be from about 20:1 to about 10:1. In other words, the weight percent (wt %) of the silsequioxane compound may vary in the range from about 1 wt % to about 50 wt %, based on the weight of the conducting polymer. Also, the weight percent may be from about 2 wt % to about 25 wt %. The weight percent may be from about 5 wt % to about 10 wt %.

Suitable solvents may include polar protic or polar aprotic solvents. For example, alkanols, such as butanol, propanol, ethanol, and methanol; amides, such as n-methylpyrrolidinone (NMP) or dimethylformamide (DMF); sulfoxides, such as dimethylsulfoxide (DMSO); ethers, such as tetrahydrofuran (THF) and diethyl ether ($Et_2O$); chlorinated solvents, such as chloroform or dichloromethane (DCM); and the like may be used as solvents. Naturally, the choice of solvent largely depends on the selections of the conducting polymer and the silsesquioxane compound. The solvents may be removed from the mixture of the conducting polymer and the silsesquioxane compound by any suitable method, such as evaporation by using a convection oven or by heating under an infrared lamp, for example.

The resulting composite mixture shows significantly improved properties favorable to its use in fuel cells and electrolyzers. For example, a composite membrane comprised of a conducting polymer and a silsesquioxane compound exhibit better performance at all temperatures, as compared to the conducting polymer alone. The composite membranes demonstrate higher proton conductivity, increased water uptake, and higher mechanical stability, as compared to a membrane, which only has a conducting polymer, having an identical thickness. The composite membranes show minimal swelling upon full solvation with water or alcohol in comparison to neat polymer membrane.

In view thereof, a method for both increasing the water uptake of a composite material and reducing a swelling ratio of a composite material upon hydration is provided by combining a silsesquioxane compound and a conducting polymer material to form the composite material. The swelling ratio is the volume increase of the composite material from a dehydrated form relative to the volume increase of the same conducting polymer material without the silsesquioxane compound present. The silsesquioxane compound and the conducting polymer form a cross-linked polymeric network that thereby reduces swelling of the composite material upon hydration.

The resulting composite mixture of the conducting polymer and the silsesquioxane can be used to prepare various components of fuel cells or electrolyzers. For example, a conducting polymer membrane or a membrane electrode assembly (MEA) may be constructed using the composite mixture of according to embodiments of the present invention.

This invention is illustrated by the following examples that are merely for the purpose of illustration and are not to be regarded as limiting the scope of the invention or the manner in which it can be practiced. Unless specifically indicated otherwise, parts and percentages are given by weight.

Nafion®-POSS® Solution Preparation

A diluted solution of Nafion® was prepared by adding about 6 milliliters of isopropanol to about 10 ml of a 5 weight percent (wt %) Nafion® solution (commercially-available solution obtained from DuPont) and then the solution was shaken for about 5 to about 10 minutes which was followed by sonicating the solution for about 30 minutes using an ultrasonic sonicator. After stirring this solution for two hours on a magnetic stirrer, an OctaSilane POSS® solution was added gradually in small portions to achieve the desired Nafion® to POSS® ratio. The OctaSilane POSS® solutions may be prepared by dissolving the solid in a suitable solvent. For example, a 10 weight percent OctaSilane POSS® in a NAFION®-POSS® solution may be prepared by dissolving about 0.055 grams of OctaSilane POSS® (purchased from Hybrid Plastics, Inc.) in about 2 milliliters of NMP or THF, after which this solution is combined portion-wise with the above diluted Nafion® solution. After the addition of each POSS® portion, the resulting mixture was shaken and sonicated for about 5 to about 30 minutes. A final homogenous Nafion®-POSS® solution was obtained by stirring the mixed solution for two hours on a magnetic stirrer.

Membrane Preparation

The membrane that was used in all experiments described below was prepared according to the following method. Membrane casting was performed using a Nafion®-POSS® solution that was prepared as described above. To cast the membrane, the solution was poured in a Petri-dish and kept in a convection oven at about 70° C. for about 12 to about 14 hours, after which the preformed membrane was annealed for two hours at a temperature ranging from about 120° C. to about 125° C. Then the membrane was subsequently pre-treated in 2% $H_2O_2$ for about 45 minutes, which was followed by treatment in 0.5 M Sulfuric acid. Finally, excess sulfuric acid was removed by boiling the membrane in de-ionized water at a temperature of about 80° C. to about 90° C. for 30 minutes or until the pH of the solution become neutral.

Catalyst Ink Preparation

The catalyst ink which was used for the MEA fabrication was prepared using 40 wt % Pt/C powder (purchased from Alfa Aesar) and a 5 wt % Nafion® solution (30 to 35 wt % with respect to carbon). For this ink preparation, 0.5 grams of 40 weight percent Pt/C powder was wetted by adding about 1 to about 2ml of de-ionized water and sonicated for about 2 to about 3 minutes. To the wet carbon was added 4 milliliters of isopropanol in small portions of about 1 milliliter each, followed by shaking the solution vigorously each time using a shaker. The Nafion® solution was then added slowly to the above ink solution and shaken for about 5 minutes. The weight percent of the Nafion® solution, relative to the carbon, was varied for each MEA.

Additionally, some MEAs were constructed with ink that comprised a silsesquioxane compound in the catalyst ink. In one embodiment, to incorporate a silsesquioxane compound in the catalyst ink, a solution of the silsequioxane compound, which may be prepared by dissolving in a suitable solvent, is added to a Pt/C and Nafion® mixture. For example, Octasilane POSS® may be dissolved in THF and added to a stiffing ink mixture comprising Pt/C and Nafion®, which is then subsequently followed by shaking for about 3 to about 5 minutes and by sonicating for about 2 minutes. This final ink mixture may be held for an extended period of time. For example, the ink mixture may be stirred for 24 hours using a magnetic stirrer at moderate speed.

MEA Design

The following alphanumeric designations are used to denote the weight percent of OctaSilanePOSS® (OSP) in either the catalyst (C) or the membrane (M). For example, OSP-0C-0M denotes that no OctaSilane POSS® is present in either the catalyst or the membrane, whereas OSP-5C-5M denotes 5 wt % of OctaSilane POSS®, relative to weight of Nafion®, was included in both the catalyst and the membrane.

For MEAs OSP-0C-5M and OSP-0C-10M, no OctaSilane POSS® was present in the catalyst ink matrix and the membrane comprised about 5 wt % and 10 wt % of POSS® in the membrane, respectively. The catalyst ink was prepared by adding 3.34 grams of the 5% Nafion® solution to the 0.5 grams Pt/C. For MEAs OSP-5C-5M and OSP-5C-10M, 5 wt % of OctaSilane POSS® was present in the catalyst matrix and the membrane comprised about 5 wt % and about 10 wt % of OctaSilane POSS®, respectively. The catalyst ink was prepared by adding 3.1 grams of 5% Nafion® solution and 5% wt % of OctaSilane POSS®, which was based on the mass of Nafion®, to the 0.5 grams Pt/C. For MEA OSP-10C-10M, 10 wt % of OctaSilane POSS® was present in the both the catalyst matrix and the membrane.

MEA Fabrication

MEAs (5 $cm^2$) were fabricated by spraying the ink directly on to a membrane using a spray gun with about 0.4 mg/$cm^2$ of Pt loading on the cathode and about 0.2 mg/$cm^2$ for the anode. A time interval of about 5 minutes was given between each spray to permit the solvent to vaporize under exposure to an IR lamp. Then the MEA was placed in a vacuum oven at about 55° C. and dried for about 12 to about 15 hours to substantially evaporate any remaining ink solvents. Finally, the MEAs were hot pressed in a hydraulic machine at a temperature of about 120° C. and a pressure of about 1000 psi for 5 minutes.

Performance of the MEA

Each of the MEAs fabricated according to the above-described procedures was tested by assembling it in a hardware purchased from Fuel cell Technologies, Inc. A 890CL fuel cell test station (Scribner Associates, Inc.) was used and it was operated using the fuel cell software (Scribner Associates, Inc.) to evaluate the performance. The cells were tested at temperatures of 60° C., 80° C., 90° C., 95° C., and 100° C. using 200 mL/min hydrogen as a fuel and 200 mL/min oxygen as an oxidant. The relative humidity (RH) of each cell was maintained at 82%, 92%, 93%, or 100% for each experiment. At each temperature, a cyclic voltammogram (CV), an AC impedance measurement and polarization curves were recorded. While the CV is used to find the electro-catalyst surface area, the AC impedance measurement estimates the cell resistance and ion conductivity; and the polarization curves estimate the performance of the cell.

CYCLIC VOLTAMMETRY (CV): CV was used for the measurement of effective surface area of the catalyst encapsulated in the MEAs by supplying hydrogen at the anode and nitrogen was passed through the cathode. Potentiostat SI 1287 was used for the measurement and Corrware (Scribner Associates Inc.) software was used for the analysis. CV was collected by sweeping the potential in the range of 0 to 0.8V at 10 mV/sec. The electrochemical surface area was calculated from the CV curve using the charge associated with the hydrogen adsorption QH as QH/Pt Loading×0.21.

AC IMPEDANCE MEASUREMENT: The membrane resistance of the MEA (cell) was obtained from AC impedence measurement using SI 1252A frequency analyzer by incrementing the frequency from 10,000 Hz to 0.1 Hz coupled with Pontentiostat SI 1287. The ohmic resistance of the cell was computed by taking the high frequency intercept of the real axis in the Niquest plot of the impedance spectra obtained at open circuit potential. The conductivity (K) of a cell having an area (A) and a thickness (t) may be calculated by measuring the ionic resistance (R) using the relationship K=t/RA.

POLARIZATION CURVES: FIGS. 1-11 show polarization curves (current density vs. potential) of the MEAs at different temperatures operated at the reported relative humidity (RH) level on both anode and cathode sides, (e.g., 100% or 93% RH). FIGS. 4-11 also show Power density vs. Current Density. The platinum loading was about 0.2 mg/$cm^2$ on the anode and about 0.4 mg/$cm^2$ on cathode.

PERFORMANCE: The performance of the fabricated MEAs was evaluated using the polarization curves, as shown in FIGS. 1-11, to show the effect of the OctaSilane POSS®. Additionally, performances at different temperatures were compared with or without the OctaSilane POSS® in the catalyst and the membrane in FIGS. 1-7. The shelf stability of OctaSilane POSS® solutions is demonstrated by FIGS. 8-10. Finally, the effect of OctaSilane POSS® on the RH requirement of the cell is demonstrated in FIG. 11.

Figure 2:
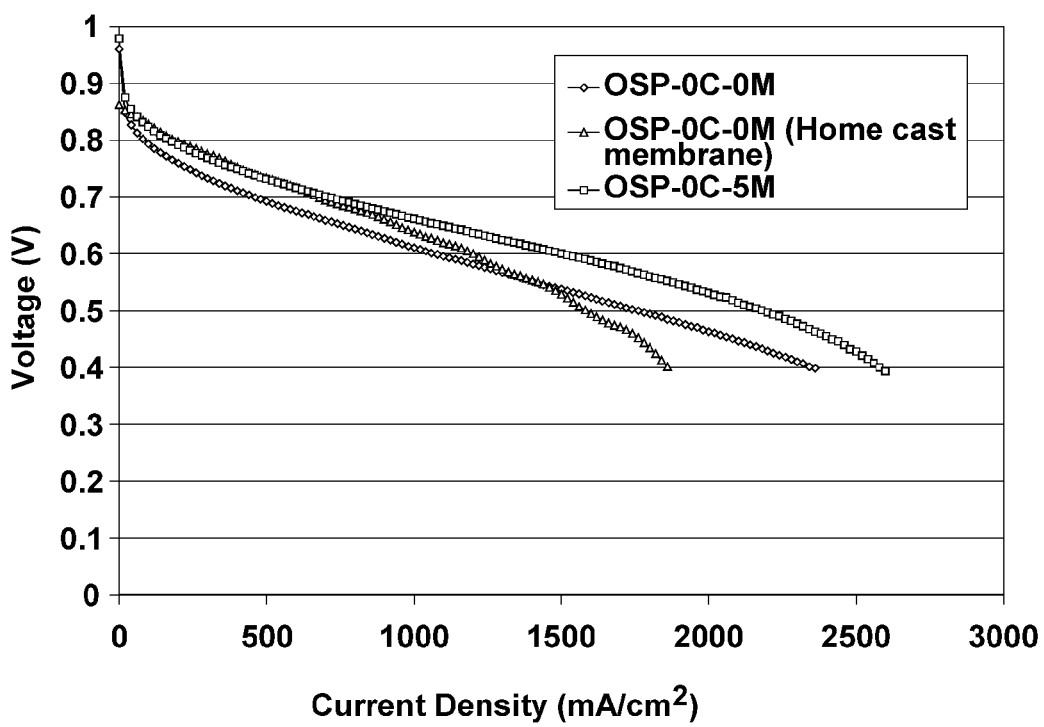
FIG. 2 is a graphical presentation of the performance of various membrane electrode assemblies (MEAs) at 90° C. and 100% RH.
Figure 3:
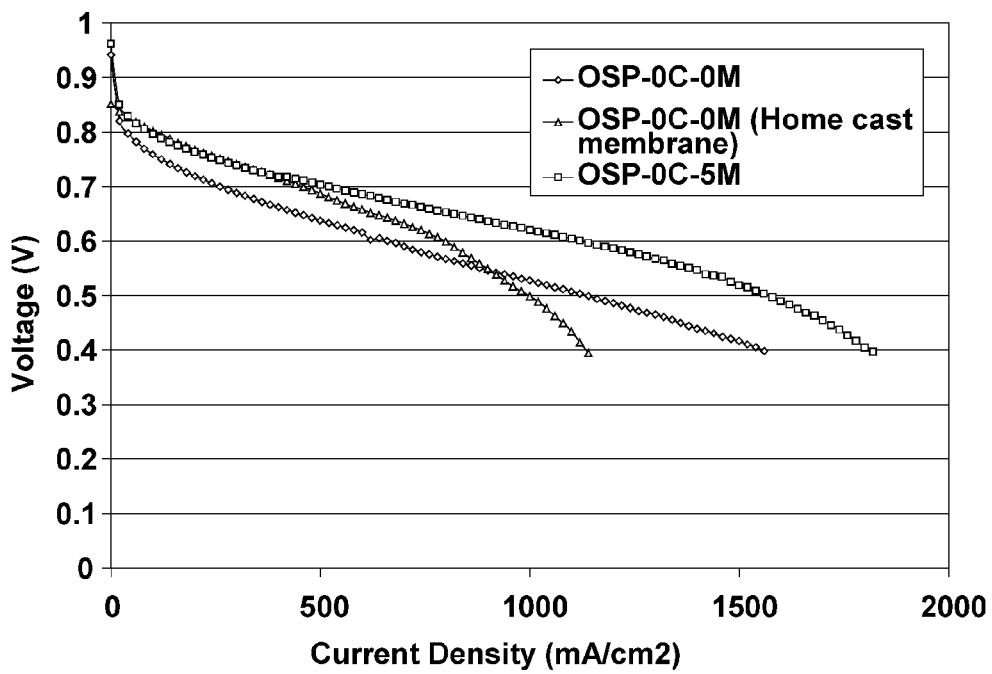
FIG. 3 is a graphical presentation of the performance of various membrane electrode assemblies (MEAs) at 100° C. and 100% RH.

EFFECT OF OSP IN THE MEMBRANE: FIGS. 1-3 illustrate the performance of the MEAs at different temperatures (80, 90 and 100° C., respectively) under the same relative humidity (RH) conditions (100% RH). MEA OSP-0C-0M was prepared using a commercially-available Nafion-212 membrane obtained from the E. I. du Pont de Nemours and Company. MEA OSP-0C-0M (Home cast membrane) was prepared from a membrane casted using 5 wt % Nafion® solution from the E. I. du Pont de Nemours and Company. MEA OSP-0C-5M was prepared from a casted membrane using a NAFION®-POSS® SOLUTION that was aged for 1 week at room temperature. The Octasilane POSS®-incorporated membrane exhibited better performance at all temperatures. Moreover, the Octasilane POSS®-incorporated membrane demonstrated higher proton conductivity, as shown in Table 1. Additionally, it was observed that the Octasilane POSS®-incorporated membrane showed minimal swelling, which is attributed to the presence of the Octasilane POSS® in the composite. Furthermore, it was noted that the Octasilane POSS®-incorporated membranes demonstrated higher mechanical stability, as compared to a commercially-available Nafion® membrane having an identical thickness. Similar stabilities were observed in other composite membranes comprising silsesquioxane compounds defined by the formula $(RSiO_{3/2})_n$.

stability, as compared to Nafion® membranes without OctaSilane POSS® having an identical thickness. Similar stabilities were observed in other composite membranes comprising silsesquioxane compounds defined by the formula $(RSiO_{3/2})_n$.

Figure 4:
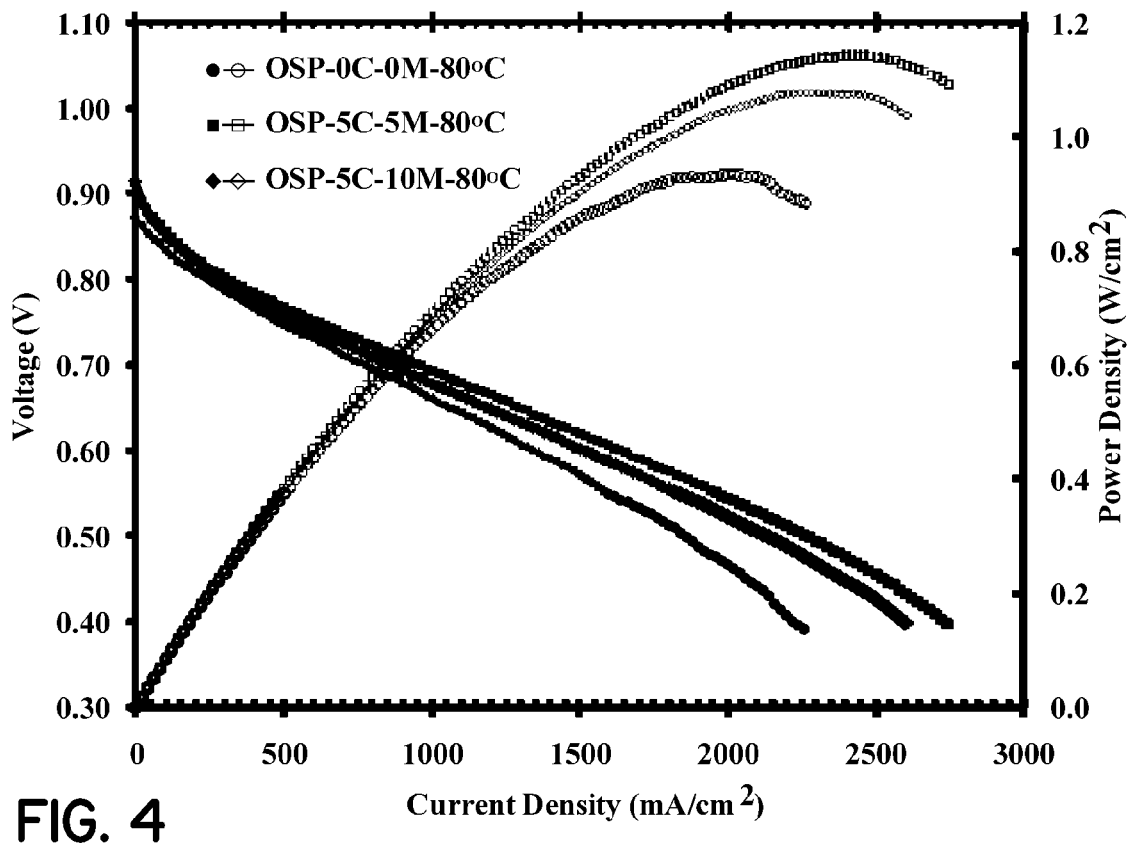
FIG. 4 is a graphical presentation of the performance of various membrane electrode assemblies (MEAs) at 80° C. and 93% RH.
Figure 5:
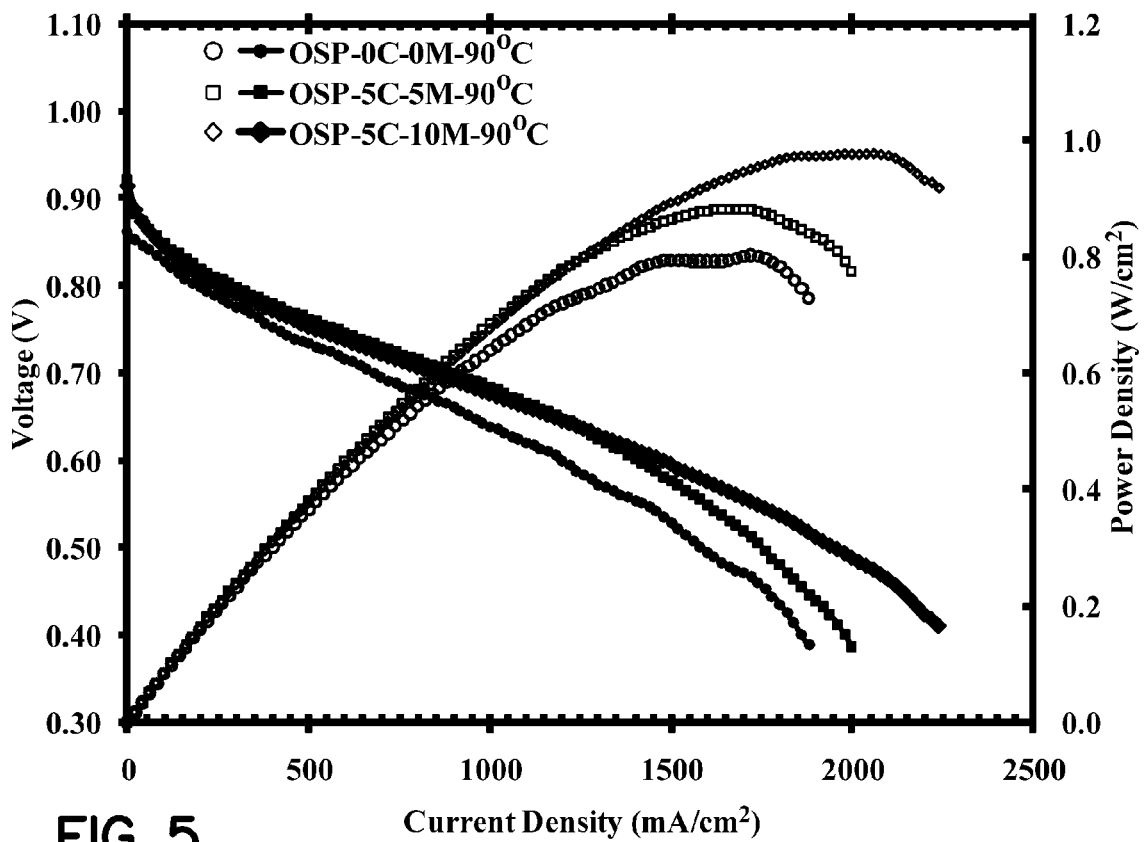
FIG. 5 is a graphical presentation of the performance of various membrane electrode assemblies (MEAs) at 90° C. and 93% RH.
Figure 6:
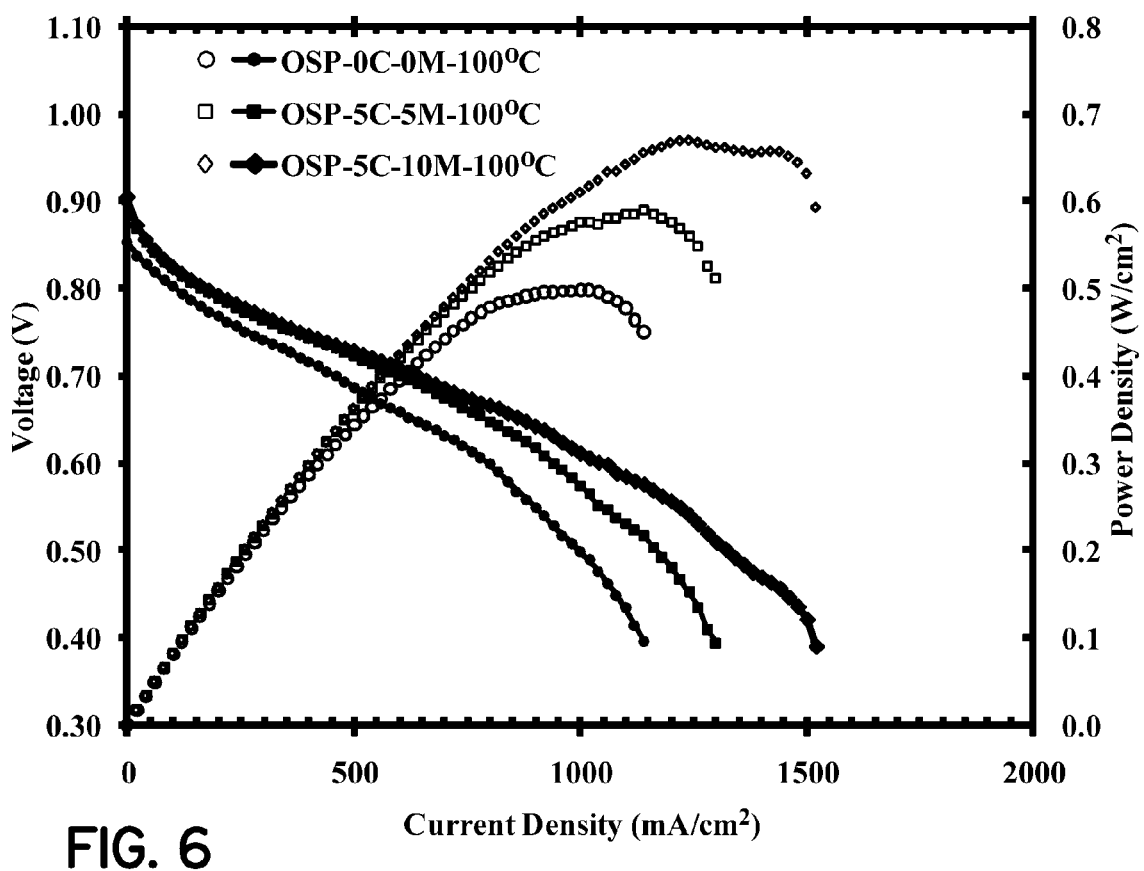
FIG. 6 is a graphical presentation of the performance of various membrane electrode assemblies (MEAs) at 100° C. and 100% RH.

FIGS. 4-6 further illustrate the enhanced performance of the cell having OctaSilane POSS® in the catalyst and the membrane, especially at higher operating temperature as compare to a cell without OctaSilane POSS® additive in the cell. As demonstrated above, the performance of neat Nafion (without OctaSilane POSS®) drops significantly at higher temperature. As shown in FIGS. 5 and 6, the cell performance increases with increasing weight percentage of OctaSilane POSS® in the membrane.

TABLE 1

Voltages at 1 A/cm² at different temperatures and the proton conductivity of select MEAs at 100% RH.

|  | OSP-0C-0M | | | OSP-0C-5M | | | OSP-5C-5M | | |
| --- | --- | --- | --- | --- | --- | --- | --- | --- | --- |
|  | 80° C. | 90° C. | 100° C. | 80° C. | 90° C. | 100° C. | 80° C. | 90° C. | 100° C. |
| Voltage @ 1 A/cm² (V) | 0.610 | 0.610 | 0.527 | 0.694 | 0.661 | 0.620 | 0.684 | 0.680 | 0.631 |
| Proton conductivity at room temp (S/cm) |  | 0.108 |  |  | 0.127 |  |  | 0.130 |  |

FIGS. 4-6 illustrate the performance of the MEAs at different temperatures (80, 90 and 100° C., respectively). The MEAs shown in FIGS. 4 and 5 were performed under the same relative humidity (RH) conditions (93% RH), whereas the MEAs shown in FIG. 6 was performed at about 100% RH. Similar to above, MEA OSP-0C-0M represents zero percent Octasilane POSS® is present in both in the catalyst and the membrane. MEA OSP-5C-5M represents 5 wt % Octasilane POSS® present in both in the catalyst and the membrane. Likewise, MEA OSP-5C-10M represents 5 wt % Octasilane POSS® is present in the catalyst and 10 wt % of Octasilane POSS® is present in the membrane.

FIGS. 4-6 further illustrate how the weight percent of OctaSilane POSS® in membrane and electrodes effects cell performance in terms of Voltage vs. Current Density (V-i) and Power Density vs. Current Density (P-i). The cell performance was measured using hydrogen as fuel and pure oxygen as an oxidant. More specifically, the performance of the cell, voltage and power density versus current density of the MEAs at 80° C. and 93% RH (anode and cathode) as a function of Octasilane POSS® is shown in FIG. 4. The performance of the cell, voltage and power density versus current density of the MEAs at 90° C. and 93% RH (anode and cathode) as a function of Octasilane POSS® is shown in FIG. 5. Further, performance, voltage and power density versus current density, of MEAs at 100° C. and 100% RH as a function of Octasilane POSS® composition on the MEAs is shown in FIG. 6.

MEA OSP-0C-0M was prepared from a membrane casted using 5 wt % Nafion® solution from the E. I. du Pont de Nemours and Company. MEA OSP-5C-5M was prepared using a 5 wt % OctaSilane POSS® in a NAFION®-POSS® SOLUTION that was aged for 1 week at room temperature. The OctaSilane POSS®-incorporated electrode and membrane exhibited better performance at all temperatures. Again, it was observed that the OctaSilane POSS®-incorporated membrane showed minimal swelling, which is attributed to the presence of the OctaSilane POSS® in the composite. Furthermore, it was noted that the OctaSilane POSS®-incorporated membranes demonstrated higher mechanical Further improvement of performance by increasing the OctaSilane POSS® content is indeed possible. The optimal OctaSilane POSS® content will obviously depend on the desired properties of the membrane. However, these results indicate that a small percent of OctaSilane POSS® additive in the catalyst and/or the membrane helps to increase the cell operating temperature by at least about 20° C. with reasonable current and power density. This observed performance improvement is provided at very little added material costs and by a simplified process. Open circuit voltages (OCV) and other performance parameters obtained at different operating temperatures are listed in Table 2. Cell operating conditions were as follows: 200 ml/min $H_2$ fuel and 200 ml/min $O_2$ oxidant at cell operating temperatures of 80° C., 90° C., and 100° C. with around 93% relative humidity.

TABLE 2

Comparison of cell performances, evaluated in terms of polarization losses against OctaSilane POSS ® composition in MEAs.

|  | OSP-0C-0M | OSP-5C-5M | OSP-5C-10M |
| --- | --- | --- | --- |
|  | Cell Operating Temperature (Anode Fuel/Cell/Oxidant) 78° C./80° C./78° C. | | |
| OCV (V) | 0.871 | 0.913 | 0.914 |
| Ohmic Resistance (mΩ · cm²) | 77.2 | 60.3 | 73.6 |
| Tafel Slope (mv/dec) | 48.9 | 66.6 | 61.4 |
| $i_0$ (A/cm²) | 1.6E−08 | 2.1E−06 | 7.7E−07 |
| Current Density @ 0.7 V (mA/cm²) | 780 | 960 | 860 |
| Peak Power Density (W/cm²) | 0.93 | 1.14 | 1.08 |
|  | Cell Operating Temperature (Anode Fuel/Cell/Oxidant) 88° C./90° C./88° C. | | |
| OCV (V) | 0.862 | 0.922 | 0.914 |
| Ohmic Resistance (mΩ · cm²) | 75.7 | 57.9 | 72.3 |
| Tafel Slope (mv/dec) | 44.7 | 61.5 | 71.3 |

TABLE 2-continued

Comparison of cell performances, evaluated in terms of polarization losses against OctaSilane POSS ® composition in MEAs.

|  | OSP-0C-0M | OSP-5C-5M | OSP-5C-10M |
|---|---|---|---|
| $i_0$ (A/cm$^2$) | 1.0E−08 | 1.8E−06 | 6.9E−06 |
| Current Density @ 0.7 V (mA/cm$^2$) | 680 | 900 | 840 |
| Peak Power Density (W/cm$^2$) | 0.80 | 0.88 | 0.98 |
|  | Cell Operating Temperature (Anode Fuel/Cell/Oxidant) 98° C./100° C./98° C. | | |
| OCV (V) | 0.852 | 0.901 | 0.904 |
| Ohmic Resistance (mΩ · cm$^2$) | 79.6 | 57.6 | 69.0 |
| Tafel Slope (mv/dec) | 63.2 | 77.3 | 79.0 |
| $i_0$ (A/cm$^2$) | 2.2E−05 | 1.8E−04 | 2.2E−04 |
| Current Density @ 0.7 V (mA/cm$^2$) | 460 | 600 | 640 |
| Peak Power Density (W/cm$^2$) | 0.50 | 0.59 | 0.67 |

As shown in Table 2, significant performance improvement was achieved, as indicated by some key parameters. For example, 5 wt % OctaSilane POSS®-containing MEA shows as much as a 60 mV gain in OCV. Likewise, significant gains in exchange current density, in some cases two orders of magnitude, were realized. This increase in exchange current signifies improved electrode kinetics. Likewise, peak power density at a given temperature was also significantly increased. Although a drop in current density was observed when the temperature was increased from 80° C. to 100° C., the incorporation of OctaSilane POSS® in the composite membrane yields an acceptable current density at a 20° C. gain in operating temperature, as compared to the neat polymer without any silsesquioxane additive.

The water uptake results, as shown in Table 3, indicates a direct correlation between the weight percent of OctaSilane POSS® in the membrane and the amount of water uptake by the membrane. The weight percent of water uptake for various membranes is listed in Table 3.

From a visual inspection of solvated membranes (in water and alcohol), it was apparent that OctaSilane POSS® controls the membrane swelling, which is one of major problem associated with membrane electrochemical cells, and thereby provides enhanced mechanical stability. The OctaSilane POSS®-incorporated composite forms a tighter network to control the swelling of the composite even in a hydrated environment, and thereby results in higher mechanical stability (such as what can be observed during membrane hand stressing).

Further to the data provided in Table 2, the open circuit voltages (OCV) also indicate a tighter network of the OctaSilane POSS®-incorporated composites. One of the reasons for lower OCV values in fuel cells is reactant crossover due to pinholes in the membrane. The silsesquioxane compound in combination with the conducting polymer forms a tighter polymeric network that thereby reduces swelling of the composite material upon hydration. This tighter network reduces the possibility of creating pinholes in the membrane, and thereby results in the reduction of reactant crossover. OCV data in Table 2 gives an indication, that silsesquioxane-incorporated membranes (5-10 wt %) offers higher OCV than does neat Nafion® membranes.

The proton conductivities were calculated from high frequency intercept of Nyquist plot. The proton conductivity of 5 wt % OctaSilane POSS® content MEA shows 0.062 S/cm at 100° C. higher than 0.059 S/cm at 80° C. (for Nafion alone) in our laboratory setup. This gives an indication that presence of OSP in the cell allows to enhance performance at elevated temperatures (see FIGS. 4-6) without reducing its proton conductivity (see Table 2 above).

TABLE 3

Water uptake study of varying OctaSilane POSS ® content in Nafion ®-OctaSilane POSS ® membranes.

| Type of membrane | Membrane dry weight (g) | Weight of membrane after absorbing water (g) | Water uptake percentage (%) |
|---|---|---|---|
| Homemade Nafion membrane | 0.249 | 0.347 | 39.357 |
| 5 wt % OSP-Nafion membrane | 0.193 | 0.276 | 43.212 |
| 7.5 wt % OSP-Nafion membrane | 0.259 | 0.396 | 53.168 |
| 10 wt % OSP-Nafion membrane | 0.151 | 0.235 | 56.213 |

Figure 7:
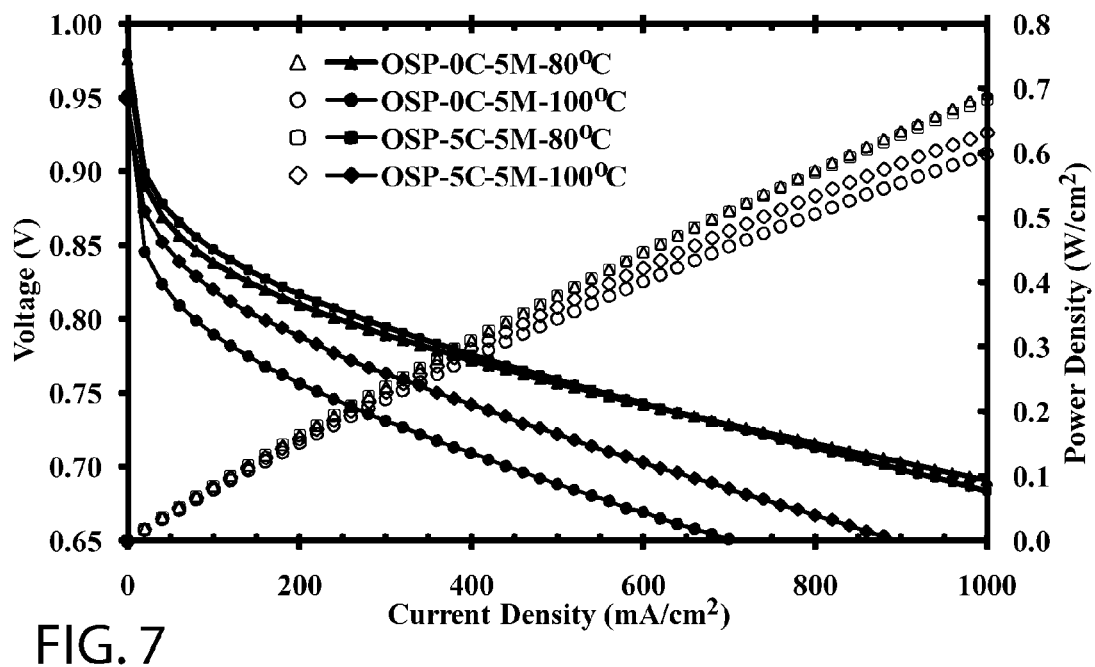
FIG. 7 is a graphical presentation of the performance of various membrane electrode assemblies (MEAs) at 80° C., 100° C. and 100% RH.

EFFECT OF OctaSilane POSS® IN THE CATALYST INK: FIG. 7 illustrates a comparison of the Voltage vs. Current Density (V-i) and Power Density vs. Current Density (P-i) curves of MEAs prepared with and without OctaSilane POSS® composition in the electrode catalyst, with each MEA having 5 wt % OctaSilane POSS® in the membrane. Results are given for two operating temperatures: 80° C. and 100° C. As can been seen from the depicted data, having OctaSilane POSS® in both membrane and electrode catalyst enhances the cell performance, especially at 100° C. Open circuit voltages (OCV) and other performance parameters obtained at different operating temperatures are listed in Table 4. Having OctaSilane POSS® in the electrode catalyst improves the electrode kinetics and the corresponding overall cell performance. Cell operating conditions were as follows: 200 ml/min H$_2$ fuel and 200 ml/min O$_2$ oxidant at cell operating temperatures of 80° C. and 100° C. with a relative humidity of about 100% at both electrodes.

TABLE 4

Comparison of cell performance parameters by varying electrode catalyst composition (with or without OSP) and as a function of temperature.

| | Cell Compositions and Operating Temperatures | | | |
|---|---|---|---|---|
| | OSP-0C-5M | | OSP-5C-5M | |
| | 80° C. | 100° C. | 80° C. | 100° C. |
| OCV (V) | 0.976 | 0.952 | 0.980 | 0.948 |
| Ohmic Resistance (mΩ · cm$^2$) | 62.6 | 71.5 | 75.0 | 75.8 |
| Tafel Slope (mv/dec) | 77.7 | 78.4 | 78.4 | 27.3 |
| $i_0$ (A/cm$^2$) | 5.8E−06 | 1.4E−04 | 8.3E−06 | 2.4E−04 |
| Current Density @ 0.7 V (mA/cm$^2$) | 920 | 700 | 900 | 860 |
| Power Density @ 0.7 V (W/cm$^2$) | 0.64 | 0.49 | 0.63 | 0.60 |

The data shown in Table 4 provides a clear indication that the presence of OctaSilane POSS® in the catalyst improves the cell performance. Also, it is evident from the data shown in FIG. 7 that MEAs, which have OctaSilane POSS® content in both the electrode catalyst and the membranes, show improved performance even at higher temperatures.

Figure 8:
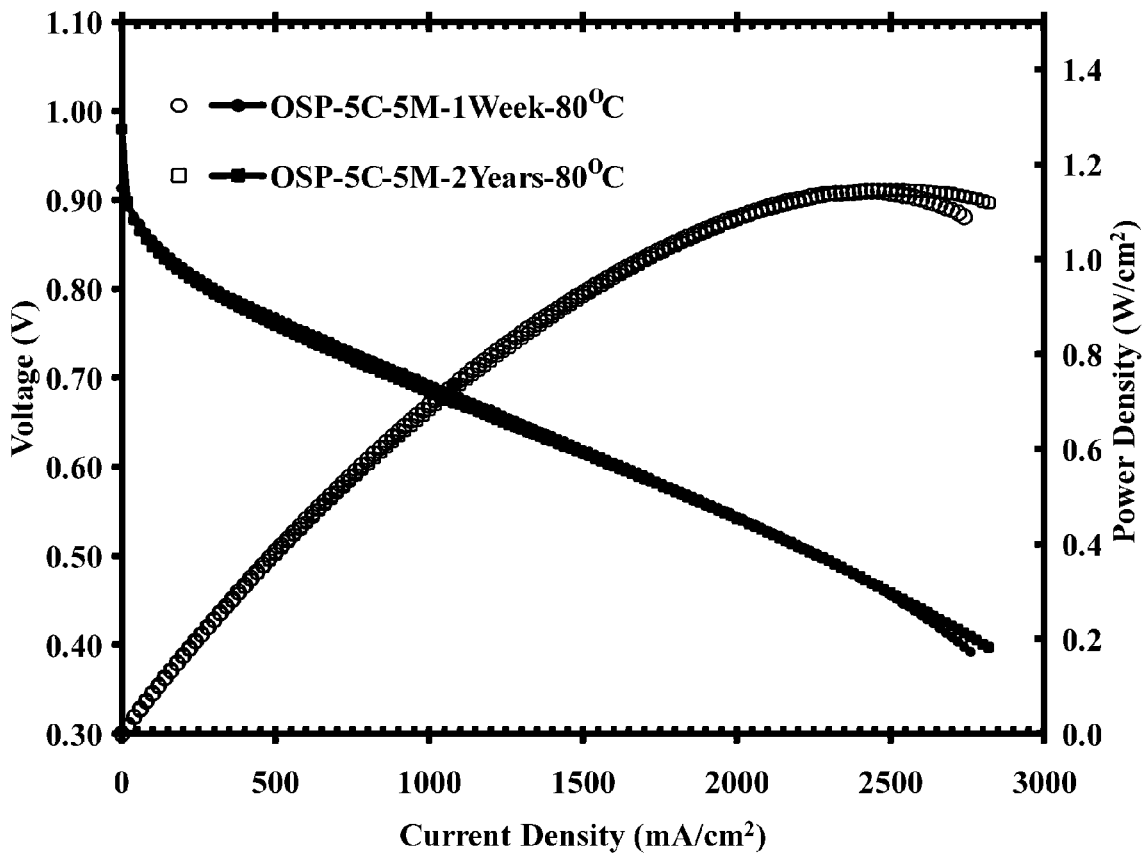
FIG. 8 is a graphical presentation of the performance of various membrane electrode assemblies (MEAs) at 80° C. and 100% RH for aged NAFION®-POSS® solutions.
Figure 9:
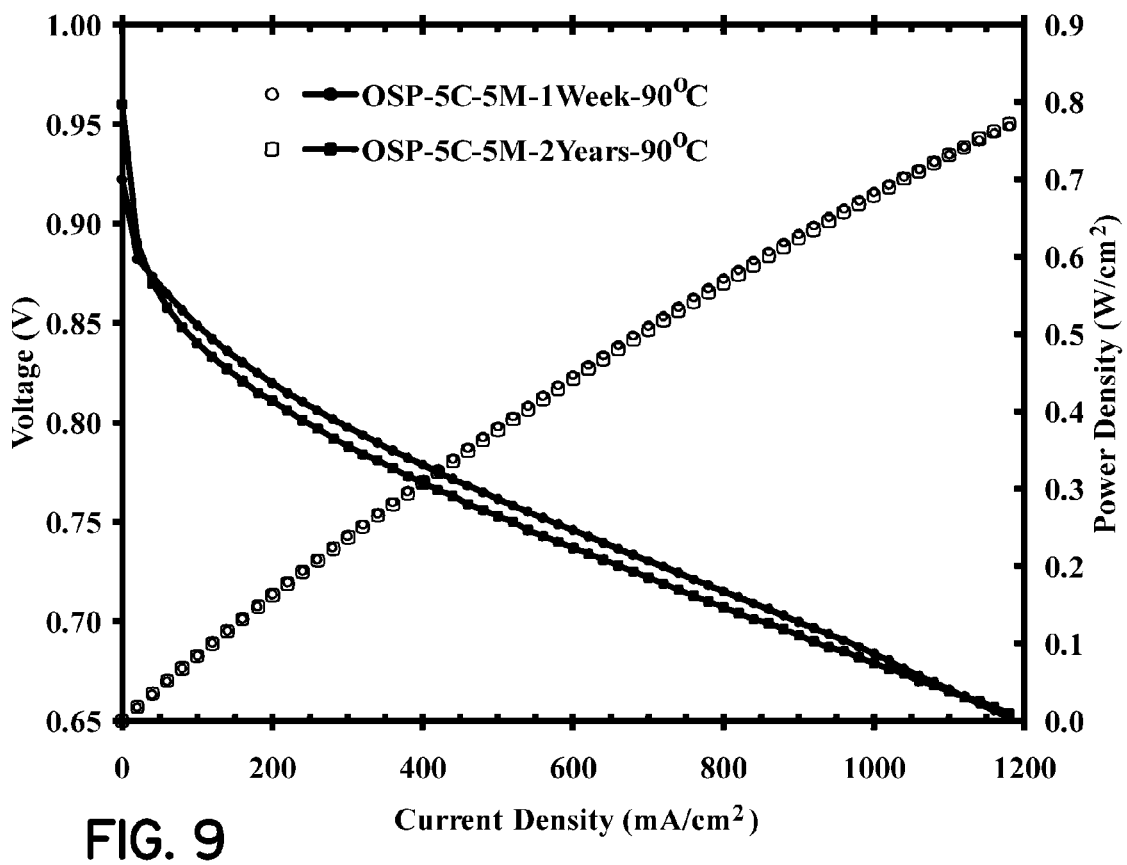
FIG. 9 is a graphical presentation of the performance of various membrane electrode assemblies (MEAs) at 90° C. and 100% relative humidity (RH) for aged NAFION®-POSS® solutions.
Figure 10:
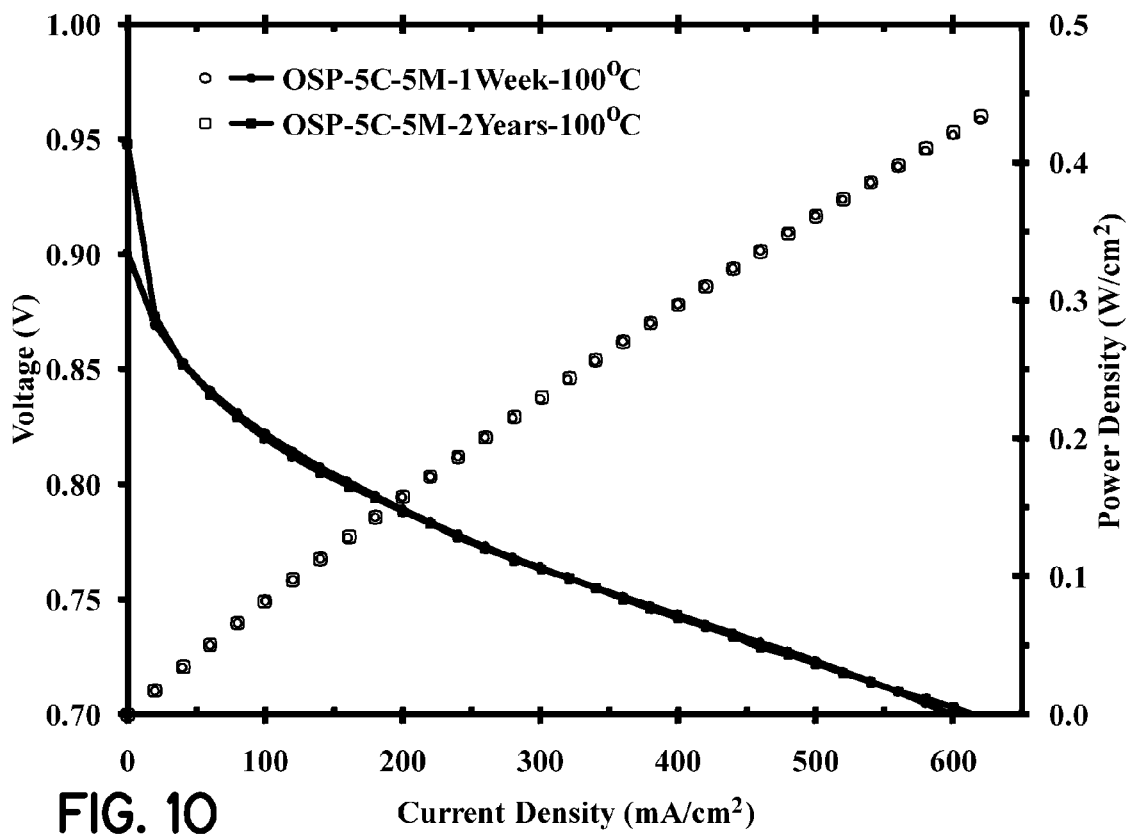
FIG. 10 is a graphical presentation of the performance of various membrane electrode assemblies (MEAs) at 100° C. and 100% relative humidity (RH) for aged NAFION®-POSS® solutions.

Lifetime (duration of shelf life after preparation) of a prepared Nafion®-OctaSilane POSS® solution was evaluated by examining its effect on cell performance. FIGS. 8-10 illustrate performance curves of MEAs of the same composition, but with different mixing times of Octasilane POSS® in the conducting polymer (Nafion®) solution. MEA OSP-5C-5M-1Week represents a MEA that has been prepared from a Nafion®-OctaSilane POSS® solution that has been aged for 1 week after formation before casting the membrane. Similarly, MEA OSP-5C-5M-2years represents a MEA that has been prepared from a Nafion®-OctaSilane POSS® solution that has been aged for about 2 years prior to casting the membrane. As shown in FIGS. 8-10, almost no performance variation was observed due to material aging of the Nafion®-OctaSilane POSS® solution.

Figure 11:
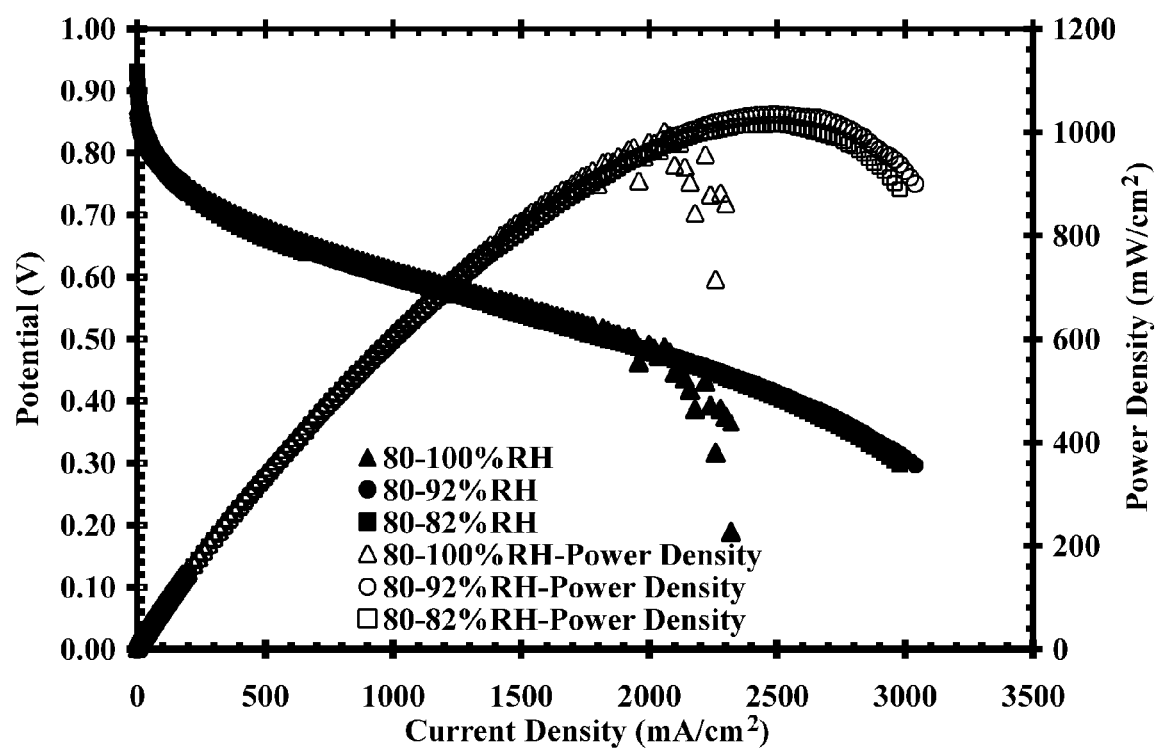
FIG. 11 is a graphical presentation of the performance of various membrane electrode assemblies (MEAs) under varied relative humidity (RH) conditions.

EFFECT OF OctaSilane POSS® ON THE RH REQUIREMENT: Performance of MEAs, which were prepared with Nafion® 212 membrane having 5 wt % OctaSilane POSS® in electrode catalyst composition, were evaluated at 80° C. using $H_2/O_2$ under relative humidity conditions of 100%, 92%, and 82%. As shown in FIG. 11, the cell demonstrated better performance at lower RHs, in comparison to 100% RH. A sudden performance drop was observed with 100% RH at higher load (around 2 A/cm$^2$), which suggests mass transfer limitations due to flooding. Notably, the performance of the cell at 92% RH and 82% RH were virtually identical. Therefore, it indicates that the cell can be operated at around 20% lower RH, in comparison to neat Nafion® in the electrodes.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. The various features of exemplary embodiments described herein may be used in any combination. Accordingly, departures may be made from such details without departing from the scope of the general inventive concept.

What is claimed is:

1. A composite polymer electrolyte membrane comprising:
a proton conducting polymer comprising a sulfonated tetrafluoroethylene-based fluoropolymer-copolymer, a sulfonated poly(ether ether ketone), or a sulfonated polyimide; and
a polyhedral oligomeric silsesquioxane compound defined by the general formula $(RSiO_{3/2})_n$, wherein R is HMe$_2$SiO and n is 8;
wherein a relative mass ratio of the proton conducting polymer to the polyhedral oligomeric silsesquioxane compound is in a range of about 100:1 to about 2:1.

2. The composite polymer electrolyte membrane of claim 1, wherein the proton conducting polymer comprises a sulfonated tetrafluoroethylene-based fluoropolymer-copolymer.

3. The composite polymer electrolyte membrane of claim 2, wherein the sulfonated tetrafluoroethylene-based fluoropolymer-copolymer comprises ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene.

4. The composite polymer electrolyte membrane of claim 1, wherein the relative mass ratio of the proton conducting polymer to the polyhedral oligomeric silsesquioxane compound is in a range of about 50:1 to about 4:1.

5. The composite polymer electrolyte membrane of claim 1, wherein the relative mass ratio of the proton conducting polymer to the polyhedral oligomeric silsesquioxane compound is in a range of about 20:1 to about 10:1.

* * * * *